United States Patent [19]

Brown et al.

[11] Patent Number: 5,269,920
[45] Date of Patent: Dec. 14, 1993

[54] CAP SYSTEM FOR UNDERDRAINS IN GRAVITY FILTERS

[75] Inventors: Marvin A. Brown, Sewickley, Pa.; Richard P. Beverly, Clackamas, Oreg.

[73] Assignee: The F. B. Leopold Co., Inc., Zelienople, Pa.

[21] Appl. No.: 948,259

[22] Filed: Sep. 21, 1992

Related U.S. Application Data

[63] Continuation-in-part of Ser. No. 679,947, Apr. 3, 1991, Pat. No. 5,149,427.

[51] Int. Cl.⁵ .................................................. B01D 24/22
[52] U.S. Cl. ..................................... 210/274; 210/275; 210/293; 239/428.5
[58] Field of Search ............... 210/274, 275, 293, 279, 210/289, 291; 239/428.5, 423

[56] References Cited

U.S. PATENT DOCUMENTS

| | | |
|---|---|---|
| 332,979 | 12/1885 | Warren . |
| 523,585 | 7/1894 | Moore . |
| 527,819 | 10/1894 | Strunz ................................. 210/293 |
| 730,518 | 6/1903 | Davis . |
| 1,572,398 | 2/1926 | Leopold . |
| 2,594,568 | 4/1952 | Lawlor ................................ 210/145 |
| 3,456,804 | 7/1969 | McGivern .......................... 210/293 |
| 3,468,422 | 9/1969 | Camp .................................. 210/274 |
| 3,512,649 | 5/1970 | Nebolsine et al. ................ 210/274 |
| 3,653,845 | 4/1972 | Moravec ........................... 23/288 R |
| 3,840,117 | 10/1974 | Ross ..................................... 210/80 |
| 4,065,391 | 12/1977 | Farabaugh ........................ 210/274 |
| 4,096,068 | 6/1978 | Walker ............................... 210/293 |
| 4,096,911 | 6/1978 | Geske ................................. 166/234 |
| 4,118,322 | 10/1978 | San Roman ....................... 210/136 |
| 4,276,265 | 6/1981 | Gillespie .......................... 422/311 |
| 4,331,542 | 6/1982 | Emrie ................................ 210/293 |
| 4,619,765 | 10/1986 | Roberts ............................. 210/293 |
| 4,707,257 | 11/1987 | Davis et al. ...................... 210/274 |
| 5,015,383 | 5/1991 | Evans et al. ..................... 210/497.1 |
| 5,019,259 | 5/1991 | Hambley ........................... 210/274 |
| 5,068,034 | 11/1991 | Walter .............................. 210/232 |
| 5,087,362 | 2/1992 | Brown .............................. 210/293 |
| 5,108,627 | 4/1992 | Berkebile et al. ................ 210/793 |
| 5,149,427 | 9/1992 | Brown et al. .................... 210/293 |
| 5,160,614 | 11/1992 | Brown .............................. 210/293 |

FOREIGN PATENT DOCUMENTS

| | | | |
|---|---|---|---|
| 541011 | 4/1922 | France ............................... 210/293 |
| 143370 | 5/1961 | U.S.S.R. ............................ 210/293 |
| 7455 | 12/1904 | United Kingdom ............... 210/293 |

OTHER PUBLICATIONS

Publication by CPC Engineering Corporation describing "Triton" underdrain systems; dated 1991.

Primary Examiner—Stanley S. Silverman
Assistant Examiner—Cynthia L. Nessler
Attorney, Agent, or Firm—Webb, Burden, Ziesenheim & Webb

[57] ABSTRACT

An improved cap for underdrains in gravity filters has a top surface and a bottom surface with a plurality of tapered screen members defining slots in the top surface. The slots provide communication with the filter bed without passage of fine grain filter media therethrough. The screen members are inclined with respect to horizontal to define a plurality of raised portions in the top surface, each raised portion defining a distribution chamber above the orifices in the distributor. The cap may be included in a capped filter underdrain block having a plurality of ribs and orifices on a top wall of the block. The cap rests on the ribs and cooperates with them to define distribution chambers above the orifices in the top wall of the block. The distribution chambers promote intermixing of air and water prior to introduction to the bed, and the ribs finely meter backwash fluids for even distribution of backwash fluids throughout the entire filter bed.

18 Claims, 2 Drawing Sheets

CAP SYSTEM FOR UNDERDRAINS IN GRAVITY FILTERS

This patent application is a continuation-in-part of U.S. patent application Ser. No. 07/679,947, filed Apr. 3, 1991, now U.S. Pat. No. 5,149,427.

BACKGROUND OF THE INVENTION

1. Field of the Invention

This invention relates to underdrains in gravity filters and, more particularly, to caps for underdrain distributors, such as filter underdrain blocks.

2. Description of the Prior Art

Gravity filters frequently employ underdrain systems for controlling and channeling effluent away from the filter bed and also for distributing backwash fluids into the filter bed. Various underdrain systems are shown and described in U.S. Pat. Nos. 3,840,117; 4,065,391; and 5,019,259. U.S. Pat. No. 5,108,627 to Berkebile, et al., incorporated herein by reference, describes an underdrain system having several filter underdrain blocks arranged end-to-end in parallel, adjacent rows across a filter bottom. The underdrain blocks provide the appropriate conduits and apertures for receiving effluent from the filter bed and discharging backwash fluids into the filter bed. The underdrain blocks have several apertures in a top wall of the blocks for this purpose. The apertures are in communication with upper secondary conduits where mixing of backwash air and water may take place prior to being introduced into the filter bed.

It has been found desirable to employ larger apertures in the top wall of the blocks so that the apertures will not clog and inhibit flow to and from the filter bed. The problem with the larger apertures is penetration of fine grain filter media, such as sand, anthracite or granular activated carbon ("GAC"), through the apertures and into the underdrain blocks. This eventually clogs the underdrains, and the loss of filter media hinders the filtering capabilities of the bed. The conventional remedy for this problem is employment of a support gravel barrier between the fine grain filter media and the underdrain blocks. However, the support gravel barrier necessitates the expensive and time-consuming installation of several discrete, layers of gravel. The support barrier typically also consumes 12 inches of filter space, which could better be used to increase the filtration capabilities of existing gravity filters or to reduce the size of newly designed gravity filters. Other problems related to employment of a gravel support barrier are discussed in the above-identified related patent application, Ser. No. 07/679,947.

Several attempts have been made in the past to produce underdrain systems which do not require support gravel barriers. For example, U.S. Pat. No. 5,068,034 to Walter discloses an underdrain lateral having three vertically stacked chambers with a nozzle having a threaded stem engaged on a top wall of the lateral. A frusto-conical upper member of the nozzle contains slotted distribution orifices for passing backwash fluids to the filter bed without admitting granular material into the lateral. A problem with this system is that backwash air and water are not intermixed until after each enters the nozzle. Thus, the scouring effect of air in the filter bed is not maximized.

A publication by C.P.C. Engineering Corporation, dated 1991, describes "Triton" underdrain systems that have a rounded screen overlying an internal flow distribution assembly. The Triton underdrain is inhibited from properly distributing backwash fluids because it cannot practically be installed at true level. Typical variations in underdrains deviate as much as $\frac{1}{8}$' from level across the length of the underdrain. As a result, incoming backwash gas collects at the high end of the underdrain, and distribution into the filter bed is uneven. This problem is enhanced by the fact that the channels and the underlying plenum in the Triton underdrain are in fluid communication across the full length of each underdrain distributor. The only metering of gas which occurs is between the underlying plenum and the apertures in the channels. The openings in the overlying screen do not provide sufficient head loss to generate any significant metering effect. Additionally, there can be little or no intermixing of backwash air and water prior to introduction to the filter bed.

Finally, U.S. Pat. No. 5,019,259 to Hambley discloses an underdrain apparatus having folded plates and apertured grids extending across troughs formed between the plates. The apertures in the grids may be fitted with individual strainers to act as fine media retainers. Each strainer has a slotted, frusto-conical body and is threadingly engaged in the aperture. However, each strainer is in fluid communication with just one aperture and receives partially intermixed backwash air and water from a secondary chamber defined by each trough. The secondary chambers are in fluid communication across the entire underdrain, as with the Triton underdrain described above.

Thus, it is an object of the present invention to provide a capped underdrain distributor which eliminates the need for support gravel in the overlying filter bed, while maximizing the distribution of backwash air and water across the entire surface of the underdrain. It is a further object to promote intermixing of backwash air and backwash water prior to introduction into the filter bed for improved scouring and cleansing of the filter media. It is a still further object to provide a capped underdrain distributor which resists fouling and which is easy to install. Finally, it is an object of the present invention to provide a capped underdrain distributor which creates sufficient head loss that backwash fluid distribution is maximized, without needlessly increasing the energy requirements for backwash operations.

SUMMARY OF THE INVENTION

Accordingly, we have invented an improved cap for underdrains having a top surface which supports a filter media and a bottom surface which faces orifices in an underdrain distributor from which may issue pre-mixed backwash gas and backwash liquid. The cap includes a plurality of tapered, spaced screen members, which define a plurality of slots in the top surface of the cap. The slots are sized to provide fluid communication between the filter media and the distributor without passage of filter media therethrough. The slots increase in cross-sectional area from the top surface to the bottom surface. The screen members are disposed at an angle with respect to horizontal to define integral, raised portions in the top surface. Each raised portion thus defines a distribution chamber between the bottom surface of the cap and the orifices in the distributor, wherein backwash air and backwash water issuing from the orifices may fully intermix and may be finely metered prior to being introduced through the slots into the filter bed.

The raised portions may be trapezoidal or frusto-conical. The screen members may have a trapezoidal, triangular or other suitable cross section. The top surface of the cap, excluding the slots, may be substantially impermeable to create head loss through the cap, which enhances distribution of backwash fluids.

The cap may be incorporated with a filter underdrain block for a filter system having a filter bottom with a plurality of underdrain distributors extending in parallel rows across the filter bottom. Each distributor comprises a plurality of underdrain blocks placed end-to-end, with a filter media supported on the underdrain blocks.

A plurality of ribs may be disposed on the top wall of each block to define a plurality of sectors. A cap in accordance with the invention is placed on the top wall of the block to provide fluid communication between the filter media and the block without passage of fine grain filter media through the cap. The cap may be positioned on the top wall of the block so that the bottom surface engages the ribs and extends above the orifices and the top surface supports the filter media. Each raised portion thus defines a distribution chamber directly above the top wall of the block. The ribs and the slots define means for uniformly distributing backwash fluids across the top surface of the cap.

Other features and advantages of the present invention will become apparent from the following description, in conjunction with the accompanying drawings.

DETAILED DESCRIPTION OF THE PREFERRED EMBODIMENT

Figure 1:
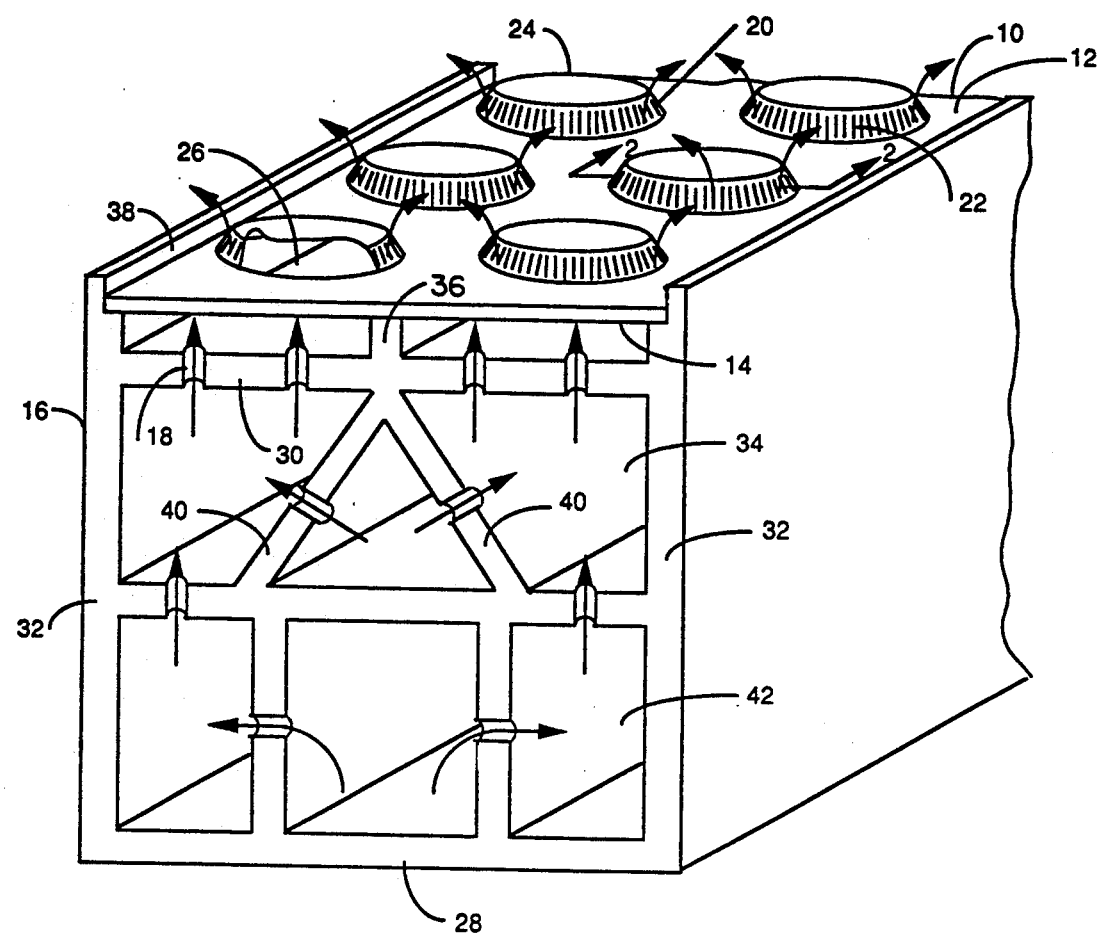
FIG. 1 is a perspective view showing a capped filter underdrain block according to a first embodiment of the invention.

FIGS. 1-4 show a cap 10 for underdrains in gravity filters having a top surface 12 and a bottom surface 14. The cap may be incorporated with a filter underdrain distributor block 16, discussed below. The underdrain blocks 16 are placed end-to-end to define a plurality of underdrain distributors extending in parallel rows across a filter bottom.

Figure 2:
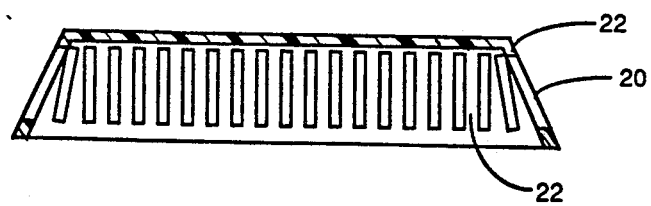
FIG. 2 is a sectional view of an integral raised portion of the cap of FIG. 1.
Figure 4:
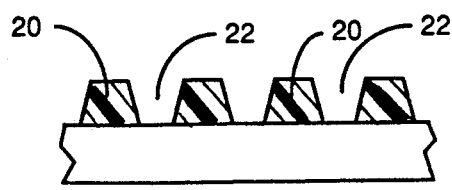
FIG. 4 is a sectional view of a plurality of tapered, spaced screen members according to the invention.

The top surface 12 supports filter media, and the bottom surface 14 faces a plurality of orifices 18 in the underdrain distributor 16 from which issue pre-mixed backwash gas and backwash liquid. The top surface 12 includes a plurality of tapered, spaced screen members 20. As shown in FIG. 2, each spaced screen member defines a plurality of slots 22 in the top surface 12. Referring to FIG. 4, the slots 22 increase in cross-sectional area from the top surface 12 to the bottom surface 14. The slots 22 are sized to provide fluid communication between the filter media and the distributor without passage of fine grain filter media therethrough. No support gravel is needed in the filter bed.

The screen members are disposed at an angle with respect to the top surface 12 to present integral raised portions 24 in the top surface 12. The raised portions 24 define a plurality of distribution chambers 26 between the bottom surface 14 and orifices 18 of the underdrain distributor block 16. The distribution chambers allow backwash air and water issuing from the orifices to fully intermix prior to introduction through the slots 22 into the filter bed.

Figure 3:
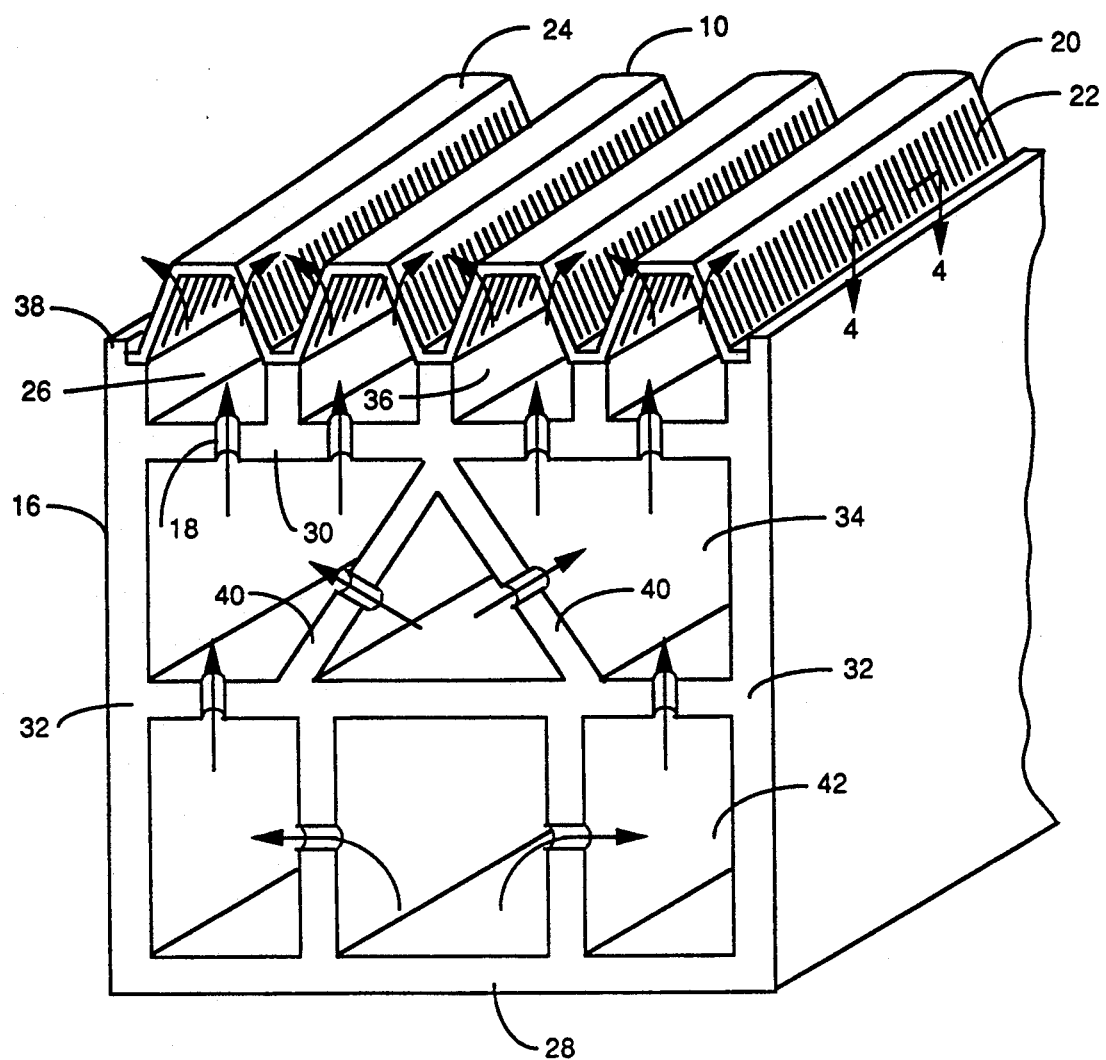
FIG. 3 is a perspective of a second embodiment of the invention.

The raised portions may be frusto-conical (FIG. 1), or trapezoidal (FIG. 3). The screen members 20 may have a trapezoidal, triangular or other suitable cross section. The top surface 12, excluding the slots 22, may be substantially impermeable to create head loss through the cap 10, which enhances distribution of backwash fluids. The slots 22, with their varying cross section, also create a certain amount of headloss and uniformly distribute backwash fluids across the top surface 12 of the cap 10.

Referring to FIG. 1, the underdrain block 16 has a bottom wall 28, a top wall 30, and a pair of side walls 32 extending between the top wall 30 and bottom wall 28. A plurality of inclined interior walls 40 define at least one primary conduit 42 and two mixing conduits 34. The top wall 30 communicates with the conduits 34 through orifices 18. Effluent from the filter media passes through the distribution chambers 26, then through the orifices 18 in the downflow mode. In the upflow mode, the orifices 18 discharge backwash fluid into the distribution chambers 26 and through the slots 22.

The top wall 30 has a plurality of ribs 36 which define a plurality of sectors. The ribs 36 finely meter backwash fluids to enhance the uniform distribution of backwash fluids across the top surface 12 of cap 10. The cap 10 is positioned so that the bottom surface 14 engages the ribs 36. Flanges 38 extend from the side walls 32 to encompass the perimeter of the cap 10. The flanges 38 have a boss on the inner surface (not shown) which provides a bearing surface for the bottom surface 14 of cap 10.

The advantages derived from the present invention may be summarized as follows:

1. The separate layer of support gravel is eliminated;
2. Distribution of backwash air and water is maximized across the entire surface of the underdrain;
3. Intermixing of backwash air and water is promoted prior to introduction into the filter bed for improved scouring and cleansing of the filter media;
4. The capped underdrain distributor resists fouling;
5. The capped underdrain distributor is easy to install; and
6. The capped underdrain distributor aids fluid distribution, without significantly increasing the energy requirements for backwash operations.

Having described the presently preferred embodiments of the invention, it will be understood that it is not intended to limit the invention except within the scope of the following claims.

We claim:

1. In a filter system having a filter bottom with a plurality of underdrain distributors extending in parallel rows across said filter bottom and a filter media supported on said underdrain distributors, each distributor having a plurality of orifices for receiving effluent in a downflow mode from the filter media and for discharging a backwash fluid in an upflow mode into said filter media, the improvement comprising a cap for said distributor, said cap comprising:

a top surface which supports said filter media and a bottom surface which faces the orifices in said distributor; and a plurality of tapered, spaced screen members, said screen members defining a plurality of slots in the top surface of said cap;

said slots sized to provide fluid communication between the filter media and said distributor without passage of filter media therethrough and increasing in cross-sectional area from said top surface to said bottom surface, said slots defining means for uniformly distributing backwash fluids across the top surface of said cap; and said screen members inclined with respect to horizontal to define integral raised portions in said top surface for extended intermixing of backwash fluids.

2. The improvement of claim 1 wherein said raised portions are frusto-conical.

3. The improvement of claim 1 wherein said raised portions are trapezoidal.

4. The improvement of claim 1 wherein the top surface, excluding said slots, is substantially impermeable.

5. The improvement of claim 1 wherein said screen members have a trapezoidal cross section.

6. A capped filter underdrain block for a filter system having a filter bottom with a plurality of underdrain distributors extending in parallel rows across said filter bottom, each distributor comprising a plurality of underdrain blocks placed end-to-end, with a filter media supported on said underdrain blocks, said capped filter underdrain block comprising:

a block having a bottom wall, a top wall and a pair of side walls extending therebetween, said block having at least one mixing conduit therethrough, said top wall having a plurality of orifices in communication with said mixing conduit for receiving effluent from said filter media in a downflow mode and for discharging a backwash fluid in an upflow mode;

a cap having a top surface and a bottom surface, with a plurality of spaced screen members on said cap, said screen members defining a plurality of slots in the top surface of said cap, said slots sized to provide fluid communication between the filter media and the orifices in said top wall without passage of filter media therethrough;

said slots defining means for uniformly distributing backwash fluids across the top surface of said cap and for extended intermixing of backwash fluids;

said screen members inclined with respect to the horizontal to define integral raised portions in said top surface.

7. The capped filter underdrain block of claim 6 wherein said screen members are tapered in the direction of said bottom surface.

8. The capped filter underdrain block of claim 6 including a plurality of ribs on said top wall, said ribs further defining means for uniform distribution of backwash fluids.

9. The capped filter underdrain block of claim 6 wherein said raised portions are frusto-conical.

10. The capped filter underdrain block of claim 6 wherein said raised portions are trapezoidal.

11. The capped filter underdrain block of claim 6 wherein said top surface, excluding said slots, is substantially impermeable.

12. The capped filter underdrain block of claim 6 including a flange extending upward around a perimeter of said top wall, said cap recessed within said flange.

13. A capped filter underdrain distributor for a filter system having a filter bottom with a plurality of underdrain distributors extending in parallel rows across said filter bottom, said distributor supporting a filter media disposed above the distributor, said capped filter underdrain distributor comprising:

a plurality of inclined walls defining at least one primary conduit and at least one mixing conduit therethrough;

a top horizontal wall having a plurality of orifices in communication with said mixing conduit, with a plurality of ribs defining a plurality of sectors;

a cap having a top surface and a bottom surface, with a plurality of spaced screen members on said cap, said screen members tapered in the direction of said bottom surface and defining a plurality of slots in the top surface of said cap, said slots sized to provide fluid communication between the filter media and the orifices in said top wall without passage of filter media therethrough;

said slots and said ribs defining means for uniformly distributing backwash fluids across the top surface of the cap; and said screen members inclined with respect to horizontal to define integral raised portions in said top surface for extended intermixing of backwash fluids.

14. The capped filter underdrain distributor of claim 13 wherein said top surface, excluding said slots, is substantially impermeable.

15. The capped filter underdrain distributor of claim 13 wherein each sector encompasses at least one orifice in said top wall.

16. The capped filter underdrain distributor of claim 13 including a flange extending upward around a perimeter of said top wall, said cap recessed within said flange.

17. The capped filter underdrain distributor of claim 13 wherein said raised portions are frusto-conical.

18. The capped filter underdrain distributor of claim 13 wherein said raised portions are trapezoidal.

* * * * *